US007469625B2

(12) United States Patent
Nassif

(10) Patent No.: US 7,469,625 B2
(45) Date of Patent: Dec. 30, 2008

(54) HYDRAULIC TRANSMISSION ACTUATOR

(75) Inventor: Serge Nassif, Mundolsheim (FR)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 161 days.

(21) Appl. No.: 10/592,677

(22) PCT Filed: Mar. 17, 2005

(86) PCT No.: PCT/EP2005/002830

§ 371 (c)(1), (2), (4) Date: Sep. 13, 2006

(87) PCT Pub. No.: WO2005/114008

PCT Pub. Date: Dec. 1, 2005

(65) Prior Publication Data

US 2007/0199394 A1 Aug. 30, 2007

(30) Foreign Application Priority Data

May 7, 2004 (DE) ...................... 10 2004 022 722

(51) Int. Cl.
*F16H 61/30* (2006.01)
*F16J 15/16* (2006.01)
*F15B 15/14* (2006.01)

(52) U.S. Cl. ..................................... 92/169.1; 92/85 R

(58) Field of Classification Search ................. 92/85 R, 92/163, 164, 165 R, 169.1
See application file for complete search history.

(56) References Cited

U.S. PATENT DOCUMENTS 2,907,304 A * 10/1959 Macks ...................... 92/162 R
2,955,667 A * 10/1960 Cota .......................... 180/428
3,132,569 A * 5/1964 Shepherd ................... 92/169.1
3,892,166 A * 7/1975 Johansson .................. 92/169.1
4,064,788 A 12/1977 Rich et al.
7,011,010 B2 * 3/2006 Spoor .......................... 92/240

FOREIGN PATENT DOCUMENTS

| | | | | |
|---|---|---|---|---|
| DE | 199 39 204 | A1 | | 2/2001 |
| EP | 0 602 425 | A1 | | 6/1994 |
| JP | 1-216147 | A | | 8/1989 |
| JP | 08105481 | A | * | 4/1996 |
| JP | 2002295413 | A | * | 10/2002 |

OTHER PUBLICATIONS

Johannes Looman, *Zahnradgetriebe*, 2nd Edition, pp. 156-158.
International Search Report dated Jun. 2, 2005 including English Translation of relevant portion (Five (5) pages).

* cited by examiner

*Primary Examiner*—Thomas E Lazo
(74) *Attorney, Agent, or Firm*—Crowell & Moring LLP

(57) ABSTRACT

A hydraulic transmission actuator has a piston/cylinder unit in which an actuating piston longitudinally displaceably arranged in the cylinder housing divides the cylinder chamber into at least two pressure chambers which can be acted upon by hydraulic oil by way of control conduits. A piston rod is connected with the actuating piston, and a sealing element is arranged on the actuating piston. The sealing element seals off the two pressure chambers from one another. The diameter of the cylinder housing is locally reduced for increasing the radial contact pressure force of the sealing element with respect to the interior cylinder wall.

8 Claims, 1 Drawing Sheet

HYDRAULIC TRANSMISSION ACTUATOR

BACKGROUND AND SUMMARY OF THE INVENTION

The present invention relates to a hydraulic transmission actuator having piston/cylinder unit in which an actuating piston longitudinally displaceably arranged in the cylinder housing divides the cylinder chamber into at least two pressure chambers which can be acted upon by hydraulic oil by control conduits, and having a piston rod connected with the actuating piston as well as having a sealing element arranged on the actuating piston, by means of which sealing element the two pressure chambers are sealed off from one another.

Hydraulic transmission actuators are used, for example, in the case of automated standard transmissions for synchronizing the transmission gears (see, for example, Johannes Lohmann, "Zahnradgetriebe", 2nd Edition, Page 156, and on).

In hydraulic transmission actuators of the above-mentioned type, the actuating piston bounded by two pressure chambers is displaced toward the left or right as a result of correspondingly being acted upon by pressure, with a sealing element being provided for sealing off the two pressure chambers on the actuating piston. When using hydraulic transmission actuators, high actuating forces have to be applied, for example, when synchronizing the transmission gears. The actuating forces require a reliable and durable sealing-off and separating of the two pressure chambers.

It is, therefore, an object of the present invention to improve the sealing-off of the two pressure chambers in the area of the actuating piston.

This object is achieved by providing that the diameter of the cylinder housing is locally reduced for increasing the radial contact pressure force of the sealing element with respect to the interior cylinder wall.

For increasing the radial contact pressure force of the sealing element with respect to the interior cylinder wall, the diameter of the hydraulic cylinder is advantageously locally reduced in an area in which high actuating forces act upon the actuating piston.

In a left and right operating position deviating from the center position of the actuating piston in the hydraulic cylinder, the diameter of the hydraulic cylinder is reduced in comparison to the diameter of the hydraulic cylinder in the center position of the actuating piston. As a result, in both operating positions of the actuating piston, a higher contact pressure force of the sealing element is achieved with respect to the interior cylinder wall.

The diameter of the hydraulic cylinder widens after passing through both operating positions, so that the contact pressure force of the sealing element with respect to the interior cylinder wall is adapted to the reduced actuating forces.

As a result of the fact that the actuating piston and, therefore also, the cylinder housing have a stepped construction, in a first adjusting path with a small piston diameter, a high adjusting speed can be achieved with low friction, while, in the two operating positions, the hydraulic force acts upon the large piston diameter, so that a higher radial contact pressure force of the sealing element against the interior wall of the cylinder housing can be generated.

The hydraulic transmission actuator can be used particularly as an actuating element for synchronizing transmission gears in the case of automated standard transmissions.

Other objects, advantages and novel features of the present invention will become apparent from the following detailed description of the invention when considered in conjunction with the accompanying drawings.

DETAILED DESCRIPTION OF THE DRAWINGS

Figure 1:
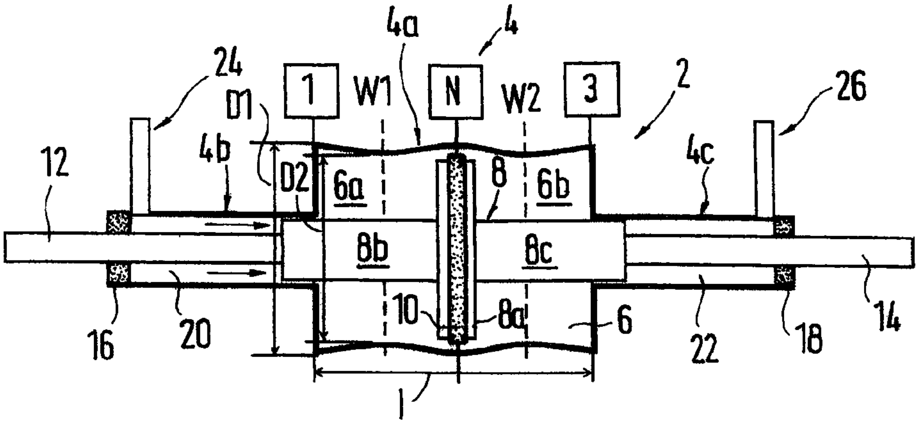
FIG. 1 is a schematic view of a hydraulic transmission actuator according to the present invention in a first operating position.

The transmission actuator 2, which is preferably used as an actuating element for the synchronization or for a gear change in the case of an automated standard transmission, has a cylinder housing 4 in whose cylinder chamber 6 a double-acting actuating piston 8 is received in a longitudinally displaceable manner. The actuating piston 8 is constructed as a step piston and has a central piston 8*a* which is guided in the cylinder chamber 6 and is adjoined by a left and a right actuating piston element 8*b*, 8*c*. On its circumferential surface, the central piston 8*a* has a sealing ring 10 which mutually seals off the two partial cylinder chambers 6*a*, 6*b* separated by the central piston 8*a*. The two actuating piston elements 8*b*, 8*c*, whose diameters are reduced in comparison to the central piston 8*a*, are longitudinally displaceably guided in a left and a right cylinder housing part 4*b*, 4*c*, respectively. One piston rod 12, 14 respectively is fastened to the left and the right actuating piston element 8*b*, 8*c*. Each piston rod 12, 14 is sealed off at the end of the left and the right cylinder housing part 4*b*, 4*c* toward the outside by way of one sealing device 16, 18 respectively.

One hydraulic conduit 24, 26 respectively is connected to the partial chambers 20, 22 formed in the left and in the respective cylinder housing part 4*b*, 4*c*, such that each hydraulic conduit 24, 26 allows hydraulic oil to act upon the two partial chambers 20, 22.

As illustrated in FIG. 1, the diameter of the central cylinder housing part 4*a* does not have a uniform construction along its length l but, in the center position of the central piston 8*a* as well as at its left and right end respectively, which corresponds to the end positions of the actuating piston 8, has a maximal diameter D1, while the diameter is continuously reduced starting from the left and right end and from the center position of the central piston 8*a*. At the two positions W1, W2 illustrated by a dash line in FIG. 1, the diameter of the central housing part 4*a* with its diameter D2 reaching a minimum on each side thereof. The radial contact pressure force of the sealing ring 10 with respect to the interior cylinder wall is the greatest when the actuating piston reaches one of these two operating positions W1 or W2 (see, for example, FIG. 3 with the arrows representing force).

The hydraulic transmission actuator when used as an actuating element for the gear change in an automated standard transmission (which includes, for example, also the so-called double-clutch transmission) operates as follows.

The center position of the central piston 8*a* corresponds to the neutral position N, while the left end position of the actuating piston 8, corresponds, for example, to an engaged gear 1, and the right end position of the actuating piston 8 corresponds, for example, to an engaged gear G3. As generally known, for changing a gear, the establishment of a non-rotatable connection is necessary between a sliding sleeve unit non-rotatably but longitudinally displaceably arranged on the transmission shaft and a loose gear assigned to the sliding sleeve unit. For equalizing the different rotational speeds of the transmission shaft and the loose gear, a synchronizing unit, made for example, by Borg-Warner, is required which is arranged between the sliding sleeve unit and the loose gear.

Figure 2:
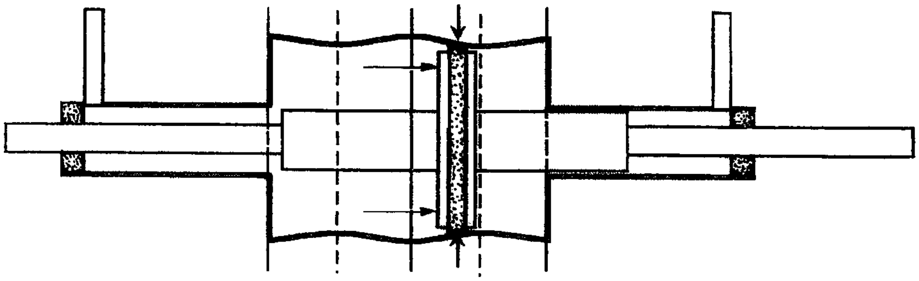
FIG. 2 is a schematic view of the transmission actuator shown in FIG. 1 but in a second operating position.
Figure 3:
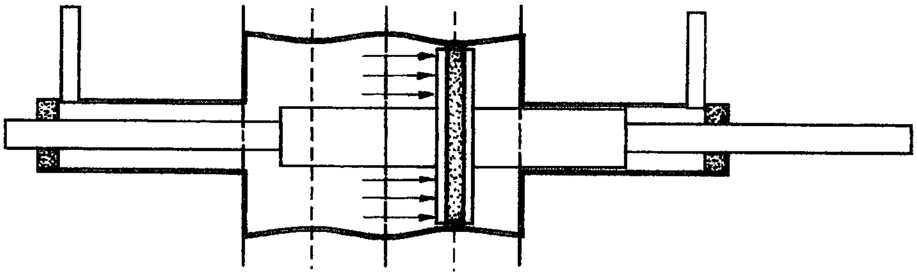
FIG. 3 is a schematic view of the transmission actuator shown in FIG. 1 but in a third operating position.
Figure 4:
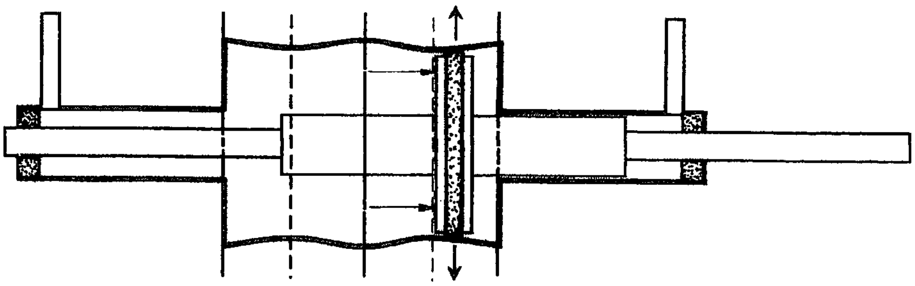
FIG. 4 is a schematic view of the transmission actuator shown in FIG. 1 but in a fourth operating position.
Figure 5:
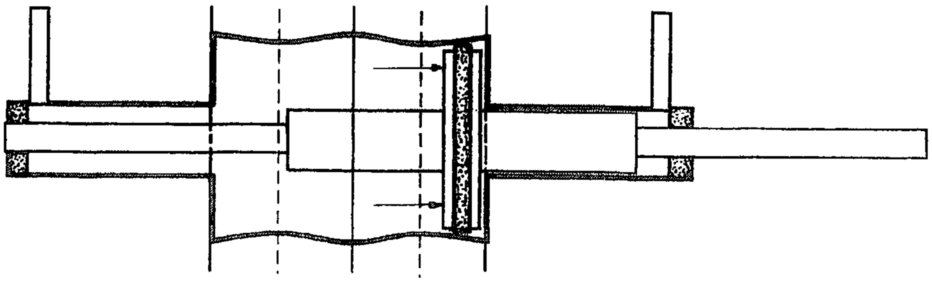
FIG. 5 is a schematic view of the transmission actuator shown in FIG. 1 but in a fifth operating position.

In the following description, the synchronization or the gear change from position N to the odd gear G3 will be explained in detail by reference to FIGS. 1 to 5. As a result of an admission of pressure to the partial chamber 20 by way of the hydraulic conduit 24, a hydraulic force acts for a first adjusting path upon the face of the left actuating piston element 8*b* and causes a corresponding displacement of the actuating piston 8. When, as indicated in FIG. 2, the left actuating piston element 8*b* is guided out of the left cylinder housing part 4*b*, the hydraulic force acts upon the left face of the central piston 8*a* which has a larger diameter. While, in the case of the first adjusting path, because of the smaller piston surface, a high adjusting speed is achieved while friction is low, the adjusting speed is reduced and reaches its minimum when, as illustrated in FIG. 3, the operating position W2 is reached by the central piston 8*a*. In this position, in which the radial contact pressure force of the sealing ring 10 is the greatest with respect to the interior cylinder wall, the synchronization takes place for the gear G3. After a synchronism has been reached between the sliding sleeve unit and the loose gear, the shifting-through of the gear can take place. Thereby, because of the reexpanding diameter of the central cylinder housing part 4*a*, the adjusting speed of the actuating piston 8 is increased again.

Of course, the use of the transmission actuator is not limited to an actuating element for the gear change in an automated standard transmission. The transmission actuator of the present invention can be used wherever, as a function of the adjusting path of the actuating piston, different demands are made on the sealing-off of the two pressure chambers separated by the central piston 8*a*.

The invention claimed is:

1. Hydraulic transmission actuator comprising a piston/cylinder unit having an actuating piston system longitudinally displaceably arranged in a cylinder housing so as to divide the cylinder chamber into at least two pressure chambers which are actable upon by hydraulic oil by control conduits, at least one piston rod connected with the actuating piston system, and a sealing element arranged on the actuating piston system, to seal off the pressure chambers from one another, wherein the diameter of the cylinder housing is locally reduced for selectively increasing the radial contact pressure force of the sealing element with respect to an interior wall of the cylinder housing, and wherein a diameter of the cylinder housing in a left and right operating position spaced from a center position of the actuating piston system is reduced with respect to a diameter of the cylinder housing in the center position of the actuating piston system,

2. Hydraulic transmission actuator according to claim 1, wherein a diameter of the cylinder housing, starting out from left and right operating positions, widens in a direction of the respective end position of the actuating piston and, in two end positions, ahs a diameter substantially the same as in a center position of the actuating piston system.

3. Hydraulic transmission actuator according to claim 2, wherein a diameter of the cylinder housing in a left and right operating position spaced from a center position of the actuating piston system is reduced with respect to a diameter of the cylinder housing in the center position of the actuating piston system.

4. A hydraulic transmission actuator according to claim 1, wherein the actuating piston system and the cylinder housing have a stepped construction.

5. In an automatic standard transmission, an actuating element for a gear change comprising a piston/cylinder unit having an actuating piston system longitudinally displaceably arranged in a cylinder housing so as to divide the cylinder chamber into at least two pressure chambers which are actable upon by hydraulic oil by control conduits, at least one piston rod connected with the actuating piston system, and a sealing element arranged on the actuating piston system, to seal off the pressure chambers from one another, wherein the diameter of the cylinder housing is locally reduced for selectively increasing the radial contact pressure force of the sealing element with respect to an interior wall of the cylinder housing.

6. In the automatic standard transmission according to claim 5, wherein a diameter of the cylinder housing in a left and right operating position spaced from a center position of the actuating piston system is reduced with respect to a diameter of the cylinder housing in the center position of the actuating piston system.

7. Hydraulic transmission actuator according to claim 5, wherein a diameter of the cylinder housing, starting out from left and right operating positions, widens in a direction of the respective end position of the actuating piston and, in two end positions, ahs a diameter substantially the same as in a center position of the actuating piston system.

8. In the automatic standard transmission according to claim 5, wherein the actuating piston system and the cylinder housing have a stepped construction.

* * * * *